April 11, 1950  C. N. ARONSON  2,504,063
FLOW REGULATOR
Filed April 21, 1945
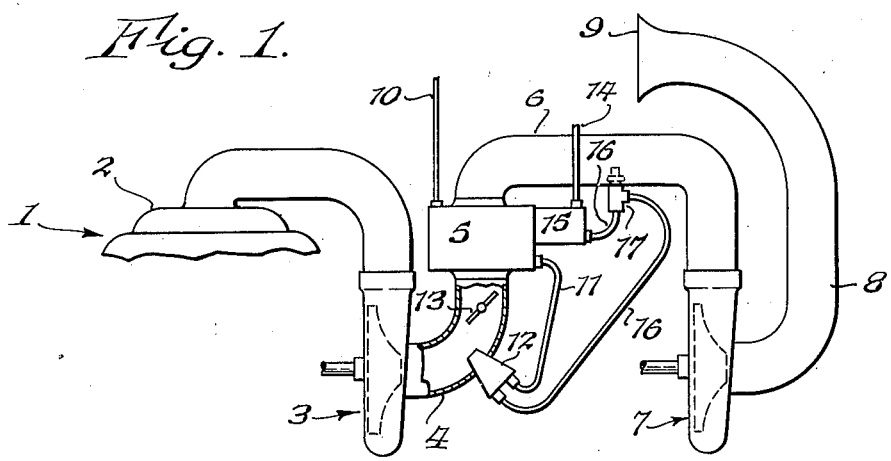
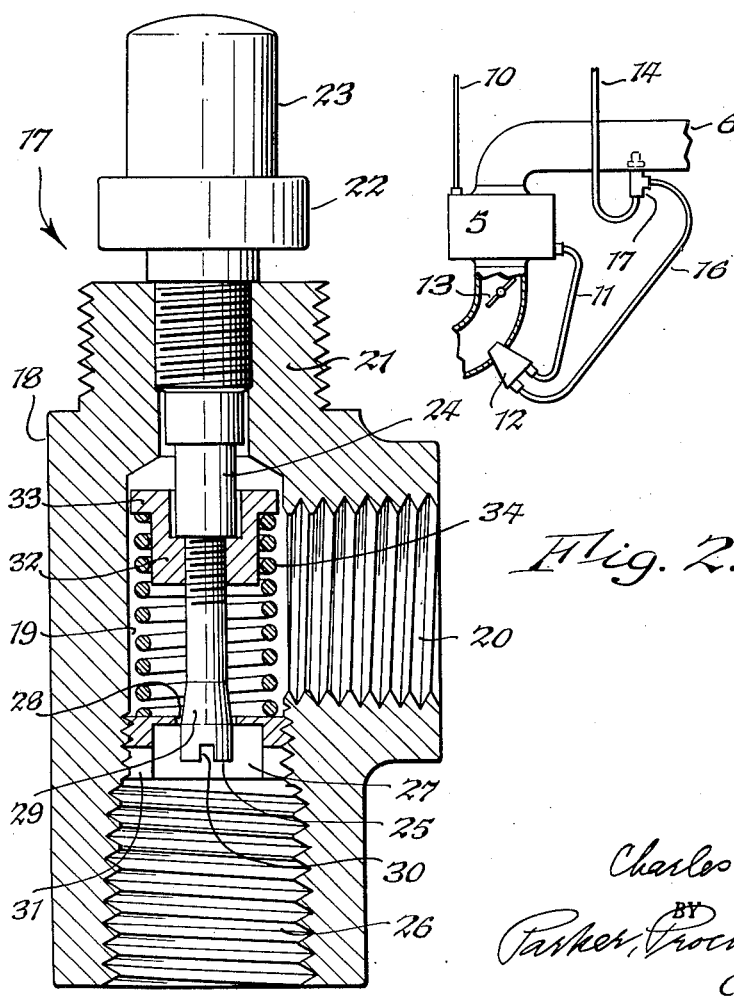
INVENTOR.
Charles N. Aronson
BY
Parker, Prochnow & Farmer,
Attorneys.

Patented Apr. 11, 1950

2,504,063

UNITED STATES PATENT OFFICE 2,504,063

FLOW REGULATOR

Charles N. Aronson, Arcade, N. Y.

Application April 21, 1945, Serial No. 589,602

5 Claims. (Cl. 138—45)

This invention relates to internal combustion engines of the high compression type, where a cooling liquid is injected into an air and fuel intake conduit in order to prevent detonation of the air and fuel in the engine cylinder. Heretofore detonation has been controlled by adding to the fuel an anti-detonating agent such as tetra-ethyl lead, or by adding more liquid fuel to the ingoing air than is required for combustion, so that by its vaporization, it reduces the temperature of the charge, or by injecting some other cooling liquid directly into the air and fuel in the intake manifold or conduit. The use of anti-detonation agents does not adequately solve the problem of detonation under all of the operating conditions to which aircraft engines may be subjected while in flight, and the use of excess fuel is extremely wasteful, and cannot be easily regulated automatically with varying conditions that may cause detonation.

The amount of cooling liquid, usually water, with alcohol or other anti-freeze added thereto to prevent its freezing, needed for injection into the intake conduit varies considerably with operating conditions. Heretofore the injection of cooling liquid has been regulated automatically in response to the manifold pressure or throttle opening. The maximum manifold pressure allowed in the operation of an internal combustion engine, particularly aircraft engines, is governed by the strength of the engine parts, and the temperature of the mixture supplied to the cylinder. The higher the manifold pressure, the higher will be the burning temperature of the mixture, and the higher the temperature the more readily will detonation occur.

An object of this invention is to provide an improved internal combustion engine in which detonation is automatically and more effectively and efficiently prevented under all operating conditions; with which objectionable roughness or unevenness in the performance of the engine under varying operating conditions will be prevented; and which will be relatively simple, practical, trouble free and inexpensive.

Another object of the invention is to provide an improved control of the injection of a cooling liquid into the intake conduit of an internal combustion engine, by which detonation is prevented in an inexpensive manner without interfering with the maximum power output of the engine under varying operating conditions; with which the flow of cooling liquid may be easily and automatically regulated under varying and different temperature conditions; which will require a minimum of servicing attention; and which will be fully automatic in action.

Another object of the invention is to provide an improved method of controlling detonation in internal combustion engines, which is automatic for varying operating conditions and relatively trouble free.

Various other objects and advantages will be apparent from the following description of two embodiments of the invention, and the novel features will be particularly pointed out hereinafter in connection with the appended claims.

In the accompanying drawings:

Fig. 1 is a schematic diagram of part of an internal combustion engine with a two-stage supercharger connected thereto, and having incorporated therein a cooling liquid injection system constructed in accordance with this invention;

Fig. 2 is a sectional elevation through the meter valve forming a part thereof; and Fig. 3 is a diagram of part of Fig. 1 showing a modification thereof.

In the embodiment of the invention illustrated in Figs. 1 and 2, the internal combustion engine 1 may be of any suitable type, preferably of the aircraft type, having an intake manifold 2 extending from the outlet port of an engine stage supercharger 3. The inlet of this supercharger is connected by a conduit 4 to a carburetor 5. The carburetor, in turn, is connected by a crossover intake conduit 6 to the discharge side of an auxiliary stage supercharger 7, and the intake side of this auxiliary stage supercharger or compressor is connected by a conduit 8 to the air-scoop 9, through which air for supporting the combustion of fuel in the engine is collected. It will be understood that any number of stages of supercharging or compression of the air, or air and fuel may be employed, and that any suitable type of carburation may be employed.

In this illustrated example of the invention, the carburetor is of the injection type in which the liquid fuel is not added to the air while in the carburetor but is added to the air in the conduit 4 after it has left the carburetor and is passing to the engine stage supercharger 3. The fuel is supplied, under pressure, through a pipe 10 to the carburetor 5, and in that type of carburetor, the flow of liquid fuel to be injected is automatically controlled by the suction in the carburetor. Carburetors of this type are well known in the art, and one example is illustrated and described, for example, on page 271 of a book entitled "Aircraft Power Plant Manual" by G. Burnell Manley, published and copyrighted in 1943 by Frederick J. Drake and Co. of Chicago, Illinois.

The fuel, in liquid condition, after its flow control by the carburetor is conducted by a fuel line 11 to an injection nozzle 12 where it is discharged as a spray into the conduit 4 that connects the carburetor to the compressor or supercharger 3. A throttle valve 13 of the butterfly type is disposed in the conduit 4 between the nozzle 12 and the carburetor, which normally controls the speed of operation of the engine.

The cooling liquid is supplied under pressure from any suitable source through pipe 14 to a water regulator 15 which has a meter valve that is opened and closed proportionally in response to the manifold pressure in the manifold 2. This has been common practice heretofore. A pipe 16 leaves the regulator 15 so as to convey the cooling liquid to an injection nozzle where it is injected into the intake passage, such as into the conduit 4 where the fuel also is injected. While a separate nozzle for injecting the cooling liquid into the conduit 4 may be employed, a dual injection nozzle may advantageously be employed, as indicated, in which the fuel and cooling liquid are both injected through a common nozzle 12 into the conduit 4. Heretofore the pipe 16 connected the regulator directly to the nozzle 12, but in accordance with this invention, the pipe 16 also has, in series therein, a meter valve 17, shown separately in Fig. 2, by which the flow of cooling liquid is further regulated in accordance with the temperature of the air being delivered to the intake manifold 2 through the intake conduit formed of conduit sections 4, 6 and 8.

Referring now to Fig. 2, this meter valve 17 includes a housing 18 having a passage 19 therein from end to end, and a lateral opening 20 communicating with this passage 19 between its ends. One end of the housing 18 is in the nature of an externally threaded boss 21, and secured in the end of the passage 19 at the boss 21, is a thermally responsive motor 22 having its thermal element or thermal power plant 23 disposed exteriorly of the housing 18 and smaller in cross section than boss 21. The casing of this motor 22 is preferably threaded into an end of the passage 19 at the boss 21, so as to close it, and this motor 23 has a working member 24, which is operated along the passage 19 by the expansion and contraction of the thermally responsive medium in the thermal element 23. Thermal motors of this type are well known and need no further explanation. The member 24 carries a rod or valve element 25, which forms an endwise extension thereof along the passage 19 and is preferably threaded into the member 24 so that it may be adjusted to extend to different extents from the member 24 along the passage 19. Disposed in the passage 19, between the lateral opening 20 and the end 26 of the passage 19 which is opposite from the motor 22, is a partition wall 27 which is preferably threaded to the wall of the passage 19 so that it may be shifted along the passage 19 to a limited extent.

The passage end 26 is preferably internally threaded to enable connection thereto of one section of pipe 16, and similarly the lateral opening 20 is also internally threaded to facilitate the connection thereto of the other section of pipe 16. The partition wall 27 is provided with an orifice or aperture 28 from face to face, through which the rod 25 extends with some clearance, and the zone 29 of the rod 25 which is within the aperture 28, is tapered or curved in an endwise direction so that as the rod 25 has relative movement in the aperture 28, the clearance between the tapered zone 29 and the wall of aperture 28 will be varied. Since the aperture 28 is in the passage 19 between the passage openings 20 and 26 that are connected to the sections of pipe 16, all of the flow through the pipe 16 will be through this aperture 28. By varying this clearance, the rate of flow through the pipe 16 may be controlled. As the rod 25 is moved endwise of itself along the passage 19 by expansions and contractions of the thermally responsive medium in the motor 22, the clearance between the tapered zone 29 and the wall of aperture 28 may be varied.

The taper of zone 29 is such that when the temperature around the thermal element 23 of the motor 22 increases, the rod 25 will be moved along the passage 19 to increase the clearance between the tapered zone 29 and the wall of aperture 28, so as to permit increased flow of cooling liquid through the pipe 16. The rod 25 has a slot 30 in its end by which it may be turned, so as to increase or decrease this clearance for the position of the motor member 24 under any temperature to which the thermal element 23 is subjected. The adjustment of the partition wall 27 also provides for an additional variation of this clearance, and this wall 27 may also have a slot 31 in its end exposed at the end 26 of the passage 19 by which it may be turned to thread it along passage 19 in either direction.

Disposed on the rod 25 and against the end of motor member 24, is a collar 32 having a laterally extending flange 33 at one end. A helical compression spring 34 surrounds the collar 32 with one end of the spring abutting against the flange 33, and the other end abutting against the partition wall 27. This spring 34 yieldingly and resiliently urges motor member 24 in a retracting direction, so that when pressure on the member 24, due to the expansion of the thermal medium in the element 23 is released, which occurs when there is a fall in temperature around the element 23, the spring 34 will cause a retraction of the member 24, and a movement of the rod 25 along passage 19 in a direction to decrease the clearance between the tapered zone 29 and the wall of aperture 28.

The regulator 15 exercises a primary regulation of the cooling liquid delivered to the injection nozzle 12, so that the flow primarily will be in proportion to the manifold pressure. The arrangement is such that when the manifold pressure increases, which occurs when the power is increased, the rate of flow of cooling liquid through the regulator is increased, so as to prevent an objectionable temperature rise in the intake manifold. This flow, which is regulated primarily by the manifold pressure, as heretofore, is further controlled by this meter valve 17. The meter valve 17 may have its thermal element in the outside air, or anywhere in the air inlet conduit connecting scoop 9 and manifold 2, but is shown as carried by the crossover conduit section 6, between the supercharger stages, and for this purpose, the boss 21 is threaded into an aperture in a wall of the conduit 6, with the thermal motor 22 and its thermal element 23 within the conduit 6, so as to be responsive to the temperature of the air delivered by the auxiliary stage 7 to the carburetor. Thus as the temperature of the air in the intake conduit 6 increases, the meter valve 17 will automatically increase the permissible rate of flow of cooling liquid in the pipe 16, and when the temperature of the air in the conduit 6 decreases, the meter valve 17 will decrease the permissible flow through the pipe 16 of the cooling liquid injected into the conduit 4. We thus have a dual automatic control of the cooling liquid, one of which controls is in response to the manifold pressure, and the other control is in response to the temperature of the air supplied to the engine.

In the embodiment of the invention illustrated in Fig. 3, the construction and arrangement is the same as in Figs. 1 and 2, except that the manifold pressure regulator 15 is omitted, and the pipe 14, which supplies the cooling liquid, is connected directly to the pipe 16 so that the meter valve 17, which is responsive to the temperature of the air in conduit 6, will exercise the sole control over the delivery of the cooling liquid by pipe 16 to the nozzle 12.

In Figs. 1 and 2, it will be noted that the temperature of the air in the intake conduit increases directly with the compression, so that the more the air is compressed to give a higher manifold pressure, the greater will be the tendency to detonation of the fuel in the engine, and a larger amount of cooling liquid will be passed by the regulator 15 to the pipe 16 for discharge into the conduit 4 for delivery to the engine cylinders. This cooling liquid thus prevents detonation. When the quantity of cooling liquid is regulated by the manifold pressure only, it does not vary in accordance with the temperature of the air actually entering the intake manifold, and may be either too much at low temperatures of the outside air, or too little at the higher temperatures. If too little cooling liquid is injected, there may be detonation of the fuel, and, on the other hand, if too much cooling is supplied, there will be roughness and unevenness in the performance of the engine. The reason for the roughness and unevenness in the operation of the engine is that if too much cooling liquid is taken into the engine cylinder with the fuel, the fuel will not burn readily, and with irregular and incomplete burning of the fuel, the performance of the engine is rough and uneven. This roughness and unevenness may also include complete failure of the mixture to burn in the cylinder where it is supposed to be ignited.

If a plane takes off from sea level and climbs to 40,000 feet elevation, for example, it passes through a wide temperature range which may be from about 120° F. at sea level to 50° F. below zero at 40,000 feet elevation. Assuming that the manifold pressure at the takeoff is 75 inches of mercury, and the plane climbs as steadily as permitted by the same manifold pressure, the engine may become very rough in performance, due to excess injected cooling liquid, at the higher altitudes, if the regulation was such that it did not detonate at sea level. It is quite possible that at 50° F. below zero, no cooling liquid at all is necessary at 75 inches mercury manifold pressure, but with this additional temperature regulation over the cooling liquid injected into the intake conduit, the cooling liquid which is introduced into the intake conduit at a particular manifold pressure at sea level where the temperature is high, may be that necessary under those conditions to prevent detonation, and with this invention, as the plane climbs to higher altitudes where the temperature of the air falls, there will be an automatic decrease in the cooling liquid delivered to the intake conduit even though the manifold pressure may remain the same. This prevents roughness and unevenness in the engine at the higher altitude and colder temperature, and effects a saving of cooling liquid.

In the example shown in Fig. 3, the regulation of the cooling liquid is solely by the temperature changes which gives a very good control of detonation and an evenness of operation of the engine under many operating conditions that are likely to be encountered. As the temperature of the air falls, the movement of the metering pin in the metering valve, as shown in Fig. 2, reduces the clearance at the aperture in the meter valve which cuts down the flow of cooling liquid regardless of the manifold pressure and of the pressure on the cooling liquid as it is supplied. In the example shown in Figs. 1 and 2, if the regulator 15 that is responsive to the manifold pressure, attempts to admit more of the cooling liquid than is required for the temperature of the air in the intake conduit at any time, the thermal control at the meter valve 17 automatically cuts down the flow. Thus we have an effective control of detonation, and the avoidance of unevenness and roughness in the performance of the engine that has previously been due to the admission of too much cooling liquid under some operating conditions.

As one practical example of the use of this device, suppose that a plane equipped with an engine having this improved control is flying at an altitude of about 25,000 feet with a manifold pressure of about 75 inches of mercury. The primary regulator for the cooling liquid connected to the carburetor is passing the cooling liquid at a rate known to be correct for that manifold pressure. The engine is operating evenly with no detonation and no roughness. It the plane is nosed down while still using the same manifold pressure of 75 inches of mercury, and great speed is obtained, which occurs, for example, when the plane is making a nose dive, the temperature of the outside air increases rapidly, and consequently, the temperature of the air in the crossover conduit 6 will become higher and higher as the plane descends. As this air temperature increases, the temperature control opens valve 17 more and more so as to admit increasing amounts of the cooling liquid and prevent detonation at the lower altitudes, as it prevented roughness and unevenness at altitudes at 25,000 feet.

As another example, let it be supposed that the time is three hours before dawn in late winter, and that the ground temperature is 40° F. below zero. The plane is alerted, started and takes off with a manifold pressure of 75 inches of mercury. Since the outside air temperature is low, the temperature of the air and fuel supplied by the superchargers is also low, and if the regulator, which is responsive only to manifold pressure was controlling the supply of cooling liquid, there might be too much cooling liquid admitted to the intake manifold, with the result that the performance of the engine would be very rough and uneven. With this temperature control in accordance with this invention, at this low temperature the quantity of cooling liquid being injected into the engine is greatly reduced, which prevents roughness and unevenness in the performance of the engine. Let us suppose that the flight ends at a field some distance south of the starting point, and several hours later. By this time the sun has risen at the southern field, and the ground temperature, let us suppose, is 70° F. If the plane takes off or lands under those conditions using the same manifold pressure of 75 inches of mercury, we still have evenness of operation of the motor with no detonation, because the temperature control, in accordance with this invention, has increased the flow of the cooling liquid, because the temperature of the air in the crossover conduit 6 has increased, and with the increased cooling liquid injected, there would be no detonation.

It will be observed from the foregoing discussion and examples that by controlling the injection of cooling liquid from the air entering, or in, the intake conduit in accordance with this invention, detonation, roughness and unevenness of operation are prevented under all operating conditions without reducing the available power of the engine and without requiring a pilot to make adjustments in flight. The adjustments required in flight are all entirely automatic, and require little or no servicing attention after once having been properly adjusted and set.

It will be understood that various changes in the details, materials and arrangements of parts, which have been herein described and illustrated in order to explain the nature of the invention, may be made by those skilled in the art within the principle and scope of the invention, as expressed in the appended claims.

I claim as my invention:

1. A thermally responsive meter valve for controlling fluid flow in a conduit in response to temperatures outside of said conduit, which comprises a housing with a passage therethrough between its ends, and having a laterally extending opening into said passage between its ends, a thermally responsive motor secured to and closing one end of said passage and having its thermal element outside of said passage, and a motor operated member extending into said passage, a rod forming an endwise extension of said member in said passage beyond said lateral opening, and a partition wall in said passage between said lateral opening and the end of said passage opposite from said motor and having an aperture through which said rod extends, the zone of said rod in said aperture being tapered, and having a clearance between the tapered part and the wall of said aperture which varies with the endwise position of said rod in the aperture, the end of said housing to which said thermal motor is attached being an exteriorly threaded boss and the portion of said thermal motor outside of said housing being smaller in cross sectional dimensions than said boss, whereby said boss may be screwed into an aperture in the wall of a conduit with said thermal element extending into that conduit, and when the end of said passage opposite from said motor and said lateral opening are connected in a series in said conduit, the fluid flow therethrough will be determined by the clearance between said tapered zone of said rod and the wall of the partition aperture, which clearance will vary with the endwise movement of said rod by said thermal motor.

2. A thermally responsive meter valve for controlling fluid flow in a conduit in response to temperatures outside of said conduit, which comprises a housing with a passage therethrough between its ends, and having a laterally extending opening into said passage between its ends, a thermally responsive motor secured to and closing one end of said passage and having its thermal element outside of said passage, and a motor operated member extending into said passage, a rod forming an endwise extension of said member in said passage beyond said lateral opening, a partition wall in said passage between said lateral opening and the end of said passage opposite from said motor and having an aperture through which said rod extends, the zone of said rod in said aperture being tapered, and having a clearance between the tapered part and the wall of said aperture which varies with the endwise position of said rod in the aperture, whereby when said lateral opening and the end of said passage opposite from said motor are connected in series in said conduit, the flow through said conduit will be varied by the movement of the tapered zone of said rod by said motor as said motor responds to the temperature variations around its thermal element, and resilient means acting between said partition wall and said motor member, for normally urging said member into a retracted position with the relatively larger portion of the tapered zone in flow restricting position in said aperture.

3. A thermally responsive meter valve for controlling fluid flow in a conduit in response to temperatures outside of said conduit, which comprises a housing with a passage therethrough between its ends, and having a laterally extending opening into said passage between its ends, a thermally responsive motor secured to and closing one end of said passage and having its thermal element outside of said passage and a motor operated member extending into said passage, a rod forming an endwise extension of said member in said passage beyond said lateral opening, and a partition wall in said passage between said lateral opening and the end of said passage opposite from said motor and having an aperture through which said rod extends, the zone of said rod in said aperture being tapered, and having a clearance between the tapered part and the wall of said aperture which varies with the endwise position of said rod in the aperture, whereby when said lateral opening and the end of said passage opposite from said motor are connected in series in said conduit, the flow through said conduit will be varied by the movement of the tapered zone of said rod by said motor as said motor responds to the temperature variations around its thermal element, said rod being threaded into said motor member to be adjustable endwise thereon, whereby the particular part of said tapered zone which is in flow restricting position in said aperture for any temperature to which the motor is subjected, may be varied by adjusting the rod endwise through said aperture.

4. A thermally responsive meter valve for controlling fluid flow in a conduit in response to temperatures outside of said conduit, which comprises a housing with a passage therethrough between its ends, and having a laterally extending opening into said passage between its ends, a thermally responsive motor secured to and closing one end of said passage and having its thermal element outside of said passage, and a motor operated member extending into said passage, a rod forming an endwise extension of said member in said passage beyond said lateral opening, and a partition wall in said passage between said lateral opening and the end of said passage opposite from said motor and having an aperture through which said rod extends, the zone of said rod in said aperture being tapered, and having a clearance between the tapered part and the wall of said aperture which varies with the endwise position of said rod in the aperture, whereby when said lateral opening and the end of said passage opposite from said motor are connected in series in said conduit, the flow through said conduit will be varied by the movement of the tapered zone of said rod by said motor as said motor responds to the temperature variations around its thermal element, said partition wall being adjustable along said passage in a direction normal to the plane of said aperture, whereby the portion of the tapered zone of said rod which is in flow restricting position for any temperature to which the motor is subjected, may be selectively varied.

5. A thermally responsive meter valve for controlling fluid flow in a conduit in response to temperatures outside of said conduit, which comprises a housing with a passage therethrough between its ends, and having a laterally extending opening into said passage between its ends, a thermally responsive motor secured to and closing one end of said passage and having its thermal element outside of said passage, and a motor operated member extending into said passage, a rod forming an endwise extension of said member in said passage beyond said lateral opening, and a partition wall in said passage between said lateral opening and the end of said passage opposite from said motor and having an aperture through which said rod extends, the zone of said rod in said aperture being tapered, and having a clearance between the tapered part and the wall of said aperture which varies with the endwise position of said rod in the aperture, whereby when said lateral opening and the end of said passage opposite from said motor are connected in series in said conduit, the flow through said conduit will be varied by the movement of the tapered zone of said rod by said motor as said motor responds to the temperature variations around its thermal element.

CHARLES N. ARONSON.

REFERENCES CITED

The following references are of record in the file of this patent:

UNITED STATES PATENTS

| Number | Name | Date |
| --- | --- | --- |
| 970,154 | Winand | Sept. 13, 1910 |
| 1,964,638 | Kreidel | June 26, 1934 |
| 2,301,355 | Armentrout | Nov. 10, 1942 |